Aug. 23, 1966 J. L. FLANAGAN 3,268,660

SYNTHESIS OF ARTIFICIAL SPEECH

Filed Feb. 12, 1963 6 Sheets-Sheet 1

INVENTOR
J. L. FLANAGAN
BY Jules P. Kirsch
ATTORNEY

Aug. 23, 1966 J. L. FLANAGAN 3,268,660

SYNTHESIS OF ARTIFICIAL SPEECH

Filed Feb. 12, 1963 6 Sheets-Sheet 4

3,268,660
SYNTHESIS OF ARTIFICIAL SPEECH
James L. Flanagan, Warren Township, Somerset County, N.J., assignor to Bell Telephone Laboratories, Incorporated, New York, N.Y., a corporation of New York
Filed Feb. 12, 1963, Ser. No. 257,947
11 Claims. (Cl. 179—1)

This invention relates to the synthesis of complex waves and, in particular, to the synthesis of natural sounding speech waves.

Conventional speech communication systems, for example, telephone systems, convey human speech by transmitting an electrical facsimile of the acoustic waveform produced by human talkers. It has been recognized, however, that facsimile transmission of the speech waveform is a relatively inefficient way to transmit speech information, because the amount of information contained in a typical speech wave may be transmitted over a communication channel of substantially narrower bandwidth than that required for facsimile transmission of the speech waveform. A number of arrangements for compressing the bandwidth necessary for transmission of speech information have been proposed, one of the best known of these arrangements being the so-called "resonance vocoder," a particular version of which is described in J. C. Steinberg Patent 2,635,146, issued April 14, 1953. Resonance vocoder systems typically transmit speech information in terms of narrow bandwidth control signals representative of selected information bearing speech characteristics, and the collective bandwidth of the control signals is substantially narrower than that of the speech wave from which they are derived.

In a resonance vocoder of the type described in the above-mentioned Steinberg patent, the selected information bearing characteristics of a speech wave which are represented by narrow bandwidth control signals are the frequencies and amplitudes of selected resonances of the vocal tract and the periodicity or randomness of the source that excites the vocal tract. The vocal tract resonance and excitation source control signals are obtained from the speech wave by an analyzer located at the transmitter station, and after transmission of the control signals to a receiver station, a synthesizer reconstructs from the control signals an artificial speech wave which is a relatively good replica of the original speech wave.

From the standpoint of transmission of information, resonance vocoders are relatively efficient, as evidenced by the small amount of transmission channel bandwidth that they require and by the relatively good intelligibility of the artificial speech they produce. From the standpoint of subjective speech quality, however, the artificial speech reproduced by a resonance vocoder does not sound as natural as speech which has been transmitted by a facsimile waveform transmission wave system.

It has been determined that one of the important factors in the perception of natural sounding speech is the presence of small irregularities in various speech parameters. These irregularities are present in the speech waveform, and therefore they are preserved in facsimile transmission systems, but in vocoder systems these naturally occurring irregularities tend to become obscured during analysis and synthesis operations One approach to the improvement of vocoder speech quality is the preservation of certain of these irregularities by transmitting a so-called baseband comprising a relatively small portion of the original speech waveform to supplement conventional narrow bandwidth control signals. By utilizing the baseband in the vocoder synthesizer, artificial speech having the same irregularities is reconstructed, thereby reproducing a natural sounding replica of the original speech wave. Examples of baseband resonance vocoders are described by M. R. Schroeder in Patent 3,030,450, issued April 17, 1962, and by J. L. Flanagan in "Resonance-Vocoder and Baseband Complement: Hybrid Speech Transmission," 1959 I.R.E. Wescon Convention Record, part 7, page 5. However, the improvement in quality attained in the above-mentioned baseband vocoder systems is accompanied by a decrease in bandwidth efficiency because the transmitted portion of the original speech waveform occupies a substantial amount of bandwidth in relation to the bandwidth of the control signals.

Another approach to the reproduction of natural sounding vocoder speech is to specify with greater precision the characteristics that influence speech quality. An arrangement embodying this approach is described in the copending application of M. V. Mathews and J. L. Miller, Serial No 92,300, filed February 28, 1961, now Patent 3,083,266, granted March 26, 1963, in which there is provided an additional narrow bandwidth control signal specifying an additional characteristic of the excitation source. Whereas conventional vocoder systems provide a so-called pitch signal representing only the periodicity or randomness of the excitation source, the Mathews-Miller system provides a so-called duty factor signal indicative of the duration of nonzero portions of each period of the excitation waveform. By specifying the nature of the excitation source with greater precision, the quality of resonance vocoder speech is enhanced with only a relatively small decrease in bandwidth efficiency.

The present invention also improves the quality of resonance vocoder speech by reproducing small irregularities inherent in normal speech sounds but the improvement in quality is effected without requiring the transmission of additional control signals beyond those already provided by well known resonance vocoder systems, supplemented by the control signal provided in the system described in the above-mentioned Mathews-Miller application. The present invention provides a bandwidth compression system with a synthesizer that is constructed to reproduce certain features of the structure of the human vocal mechanism so that small irregularities are introduced into the artificial speech wave during synthesis. By introducing these irregularities during synthesis, a more natural quality is imparted to vocoder speech sounds without decreasing vocoder bandwidth efficiency.

It is well known that human speech sounds are produced by excitation of the human vocal tract, the type of sound depending upon the manner in which the vocal tract is excited. Thus, the voiced portions of a speech wave are produced by exciting the vocal tract resonances with quasi-periodic puffs of air which are released from the lungs by the glottis or vocal folds, while the unvoiced portions of a speech wave are produced by the turbulent passage of air from the lungs through constrictions in the vocal tract. It has been determined that one of the small irregularities which are important to the naturalness of voiced speech sounds is the presence of small variations in vocal tract resonances during each period of glottal excitation. Investigation of these variations has revealed that the bandwidths and frequencies of the vocal tract resonances are functions of the area of the glottal opening, so that changes in the area of the glottal opening during each period of excitation produce related variations in the bandwidths and frequencies of vocal tract resonances during each period of excitation. These variations may be demonstrated by approximating the vocal tract with a closed straight tube. The natural resonances of this tube have fixed bandwidths and frequencies, but by making a small opening in one end of the tube, the opening corresponding to the glottis, and by periodically varying the area of this opening, the resonances of the tube may be varied in both frequency and bandwidth in a fashion similar to the variation of vocal tract resonances with changes in the glottal area.

The present invention provides for the reproduction of the above-mentioned variations in vocal tract resonances by generating from a glottal duty factor signal of the type provided by the aforementioned Mathews-Miller vocoder, a signal closely approximating the time-varying area of the glottal opening. This time-varying glottal area signal is employed in the synthesis of an artificial speech wave to vary the bandwidths and frequencies of the reconstructed resonances thereby reproducing a natural sounding replica of the original speech wave. Further, these variations in the resonances of the artificial speech wave are introduced at the synthesizer of the present invention and do not require the transmission of additional speech information, hence the improvement in vocoder speech quality achieved by this invention is not accompanied by a decrease in vocoder bandwidth efficiency.

The invention will be more fully understood from the following detailed description of illustrative embodiments thereof, taken in connection with the appended drawings, in which.

*Theoretical considerations*

The human vocal mechanism comprises a vocal tract terminated by the glottis at one end and by the mouth and lips at the other end, and a nasal tract which may be coupled to the vocal tract by the velum. These elements of the vocal mechanism are illustrated by an X-ray photograph in an article by J. L. Flanagan entitled "A Resonance-Vocoder and Baseband Complement: A Hybrid System for Speech Transmission," 1959 I.R.E. Wescon Convention Record, part 7, pages 5, 12. Voiced speech sounds are produced by quasi-periodic puffs of air released from the lungs into the vocal tract by the glottis, while unvoiced speech sounds are produced by the turbulent flow of air from the lungs through constrictions in the vocal tract.

Figure 4A:
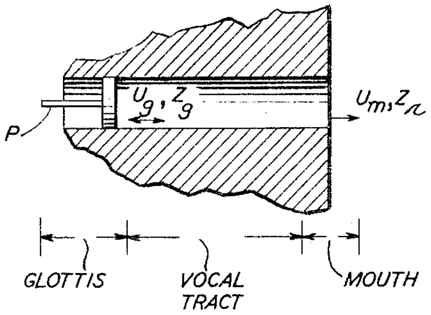
FIGS. 4A, 4B and 4C are diagrams of assistance in explaining certain principles of the present invention.
Figure 4B:
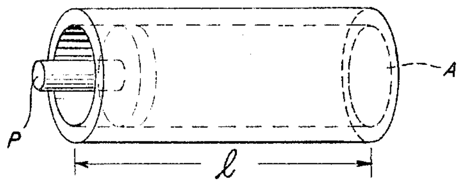

To a first order approximation, the vocal tract may be represented by a single cylindrical tube of the type shown in FIG. 4B, where the cross-sectional area A of the tube is made equal to the mean cross-sectional area of the vocal tract, and the length $l$ of the tube is determined by the length of the vocal tract from glottis to mouth. As shown in FIG. 4A, during voiced sounds the glottal excitation source at one end of the vocal tract may be approximated by a vibrating piston P, which acts as a source of acoustic volume velocity $U_g$ having an inherent acoustic impedance $Z_g$, and the corresponding acoustic volume velocity and radiation impedance at the mouth may be denoted $U_m$ and $Z_r$, respectively.

Figure 4C:
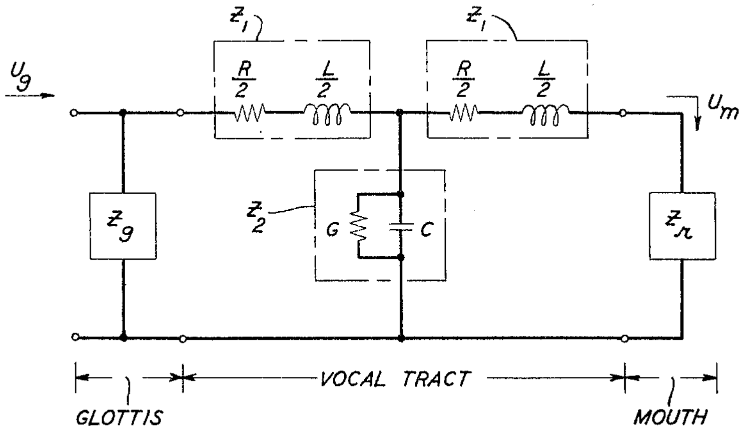

The mechanism of speech production may be treated by analyzing an electrical network equivalent, illustrated in FIG. 4C, of the cylinder approximation shown in FIG. 4A. As shown in FIG. 4C, an equivalent network of the cylindrical tube in FIG. 4A is a so-called T network of the type explained in G. Fant, Acoustic Theory of Speech Production, page 28 (1960). The impedance elements $Z_g$, $Z_r$, $Z_1$, and $Z_2$ indicated in FIG. 4C are defined as follows:

$Z_g$ is the acoustical impedance of the glottal excitation source;

$Z_r$ is the radiation load at the mouth;

$$Z_1 = Z \tanh\left(\frac{\gamma l}{2}\right)$$

and $$Z_2 = \frac{Z}{\sinh(\gamma l)}$$

where Z is the characteristic impedance of the tube and is equal to $$Z = \sqrt{\frac{z}{y}} = \sqrt{\frac{R + j\omega C}{G + j\omega L}}$$

the elements R, L, G, and C respectively denoting the distributed resistance, inductance, conductance, and capacitance per unit length of the tube; $\gamma$ is the complex propagation constant comprising the real attenuation constant $\alpha$ and the complex phase constant $\beta$;

$$\gamma = (\alpha + \beta) = \sqrt{z \cdot y} = \sqrt{(R + j\omega L)(G + j\omega C)}$$

where for low loss conditions, that is, for $R << j\omega L$ and $G << j\omega C$, the complex phase constant $\beta$ may be approximated by $$\beta \cong \frac{s}{c}$$

where $c$ is the velocity of sound and $s$ is the complex frequency variable, $$s = \sigma + j\omega$$

The transmission characteristic of the tube is defined as the ratio of output current $U_m$ (acoustic volume velocity at the mouth) to input current $U_g$ (acoustic volume velocity at the glottis). Since the radiation load at the mouth, $Z_r$, is generally very small in magnitude in comparison with the characteristic impedance Z, $Z_r$ may be assumed to be zero, and the transmission characteristic of the tube, which may be determined from well-known transmission line theory, is found to be $$\frac{U_m}{U_g} = \frac{1}{\left[\frac{Z_1}{Z_g}\left(\frac{Z_g}{Z_2} + \frac{Z_1}{Z_2} + 1\right) + 1 + \frac{Z_1}{Z_g}\right]} \quad (1)$$

Substituting for the impedances in Equation 1 from the definitions given above, the transmission characteristic may be expressed as $$\frac{U_m}{U_g} = \frac{1}{\cosh \gamma l + \frac{Z}{Z_g} \sinh \gamma l} = \frac{\cosh \gamma l}{\cosh (\gamma + \gamma_g) l} \quad (2)$$

where $$\gamma_g l = \tanh^{-1} \frac{Z}{Z_g} \quad (3)$$

The vocal tract resonances, which are generally determined in resonance vocoders from the formants or peaks of the amplitude spectrum of a speech waveform, are the poles of the transmission characteristic given in Equation 2 above. The poles of Equation 2 are those complex frequencies which case the denominator of Equation 2 to become equal to zero, that is, $$\cosh (\gamma + \gamma_g) l = 0$$

or, $$(\gamma + \gamma_g) l = \pm j(2n+1)\frac{\pi}{2},\ n = 0, 1, 2, \ldots \quad (4)$$

In order to solve Equation 4 for the specific complex frequencies which make the denominator of Equation 2 equal to zero, the elements of Equation 4 may be expressed as follows: First, from the definitions given above, $$\gamma=\alpha+\beta=\alpha+\frac{s}{c} \qquad (5)$$

Next, since the glottal impedance, $Z_g$, is ordinarily substantially larger than the characteristic impedance of the tube, Z, Equation 3 may be approximated by the first term in the power series expansion of $\tanh^{-1}$, $$\gamma_g l \cong \frac{Z}{Z_g} \qquad (6)$$

Finally, the small signal equivalent of the glottal impedance, $Z_g$, as explained in J. L. Flanagan, "Some Properties of the Glottal Sound Source," volume 1, Journal of Speech and Hearing Research, page 99 (1958), may be expressed as the sum of a resistive component, $R_g$, and an inductive component, $sL_g$, where $s$ is again the complex variable $s=\sigma+j\omega$, $$Z_g=R_g+sL_g \qquad (7)$$

hence Equation 6 becomes $$\gamma_g=\frac{1}{l}\,\frac{Z}{R_g+sL_g}=\frac{Z}{l}\left(\frac{1}{R_g+sL_g}\right) \qquad (8)$$

Equation 8 may be rewritten by dividing $R_g+sL_g$ into unity and ignoring all but the first two terms of the dividend; that is, $$\frac{1}{R_g+sL_g}=\frac{1}{R_g}-s\frac{L_g}{R_g^2}+s^2\frac{L_g^2}{R_g^3}-\dots$$

$$\cong\frac{1}{R_g}-s\frac{L_g}{R_g^2}$$

since for all cases of interest in the frequency range below 3,000 cycles per second $R_g>>sL_g$. Hence Equation 8 becomes $$\gamma_g=\frac{Z}{l}\left(\frac{1}{R_g+sL_g}\right)\cong\frac{Z}{lR_g}=s\frac{ZL_g}{lR_g^2} \qquad (9)$$

Substituting Expressions 5 and 9 in Equation 4, $$\alpha+\frac{s}{c}+\frac{Z}{lR_g}-s\frac{ZL_g}{lR_g^2}=\pm j(2n+1)\frac{\pi}{2l}$$

and collecting terms in $s$, $$s\left(1-\frac{c}{l}\,\frac{ZL_g}{R_g^2}\right)=-\alpha c-\frac{Zc}{lR_g}\pm j(2n+1)\frac{\pi c}{2l}$$

$$s=\frac{1}{1-\frac{c}{l}\,\frac{ZL_g}{R_g^2}}\left[\left(-\alpha c-\frac{Zc}{lR_g}\right)\pm j(2n+1)\frac{\pi c}{2l}\right]$$

$$n=0, 1, 2, \dots \qquad (10)$$

From Equation 10 it is evident that the complex variable $s$ is a function of the integer $n$, and may be denoted $$s_n=\sigma_n+j\omega_n$$

It is also evident from Equation 10 that the real and imaginary parts of $s_n$ may be expressed as follows:

$$\sigma_n=\frac{1}{1-\frac{c}{l}\,\frac{ZL_g}{R_g^2}}\cdot\left(-\alpha c-\frac{Zc}{lR_g}\right) \qquad (11a)$$

and $$\omega_n=\frac{1}{1-\frac{c}{l}\,\frac{ZL_g}{R_g^2}}\cdot\pm(2n+1)\frac{\pi c}{2l} \qquad (11b)$$

The bandwidths and frequencies of the vocal tract resonances are defined as $$B_n=\frac{\sigma_n}{\pi} \qquad (12a)$$

and $$F_n=\frac{\omega_n}{2\pi} \qquad (12b)$$

respectively, hence Equations 11*a* and 11*b* show that resistive and inductive components of the time-varying glottal impedance affect both the bandwidth and the frequency of each vocal tract resonance. The effect of the glottal impedance on resonance bandwidths and frequencies may be expressed in terms of the time-varying area of the glottal opening by redefining the resistive and inductive components of the glottal impedance in terms of the area of the glottal opening, as explained by J. L. Flanagan in "Some Properties of the Glottal Sound Source," volume 1, Journal of Speech and Hearing Research, page 99 (1958):

$$R_g=\frac{12\mu d h^2}{A_g^3(t)}+0.875\frac{(2\rho P_s)^{1/2}}{A_g(t)} \qquad (13a)$$

$$L_g=\frac{\rho d}{A_g(t)} \qquad (13b)$$

where $A_g(t)$ is the time-varying area of the glottal opening, also referred to as the glottal area function;
$P_s$ is the pressure beneath the vocal folds;
$\rho$ is the air density;
$d$ is the depth or thickness of the vocal folds;
$h$ is the length of the vocal fold slit; and
$\mu$ is the kinematic coefficient of viscosity for air.

To a first approximation, the second term of Equation 13*a* is more important, so that $$R_g\cong\frac{\text{a constant}}{A_g(t)} \qquad (13c)$$

and $$L_g=\frac{\text{a constant}}{A_g(t)} \qquad (13d)$$

Substituting Equations 12*a*, 12*b*, 13*c*, and 13*d* into Equations 11*a* and 11*b*, $$B_n=\frac{1}{1-[\text{a constant}]\cdot[A_g(t)]}\cdot(-\alpha c-[\text{a constant}][A_g(t)])$$

and $$F_n=\frac{1}{1-[\text{a constant}][A_g(t)]}\cdot\pm(2n+1)\frac{c}{4l}$$

Examining $B_n$ first, it is observed that the multiplicative term is very nearly equal to unity because the characteristic impedance Z is relatively small. Hence $B_n$ may be rewritten $$B_n\approx(\approx 1)(-1)(B_c+B_A) \qquad (14a)$$

where $$B_c=\alpha c$$

and $$B_A=[\text{a constant}]\cdot[A_g(t)]$$

Thus the primary influence of changes in glottal area upon resonance bandwidths is an additive one. However, in the case of resonance frequencies, the only influence of changes in glottal area is a multiplicative one, that is, $F_n$ may be rewritten $$F_n=F_A\cdot\pm(2n+1)\frac{c}{4l} \qquad (14b)$$

where $$F_A=\frac{1}{1-[\text{a constant}]\cdot[A_g(t)]} \qquad (14c)$$

Expressions 14*a* and 14*b* reveal that the vocal tract resonances are functions of the glottal area function, $A_g(t)$. Since the glottal area function varies in magnitude during each period of excitation, as pointed out by J. L. Flanagan in the above-mentioned article in volume 1, Journal of Speech and Hearing Research, the bandwidths and frequencies of the vocal tract resonances also vary during each period of glottal excitation according to the relationships given by Expressions 14*a* and 14*b*. It has been determined that these variations constitute one of the naturally occurring irregularities that influence speech quality.

In the synthesizer of a typical resonance vocoder, the bandwidths of the reconstructed speech resonances are set at a predetermined value, while the frequencies of the reconstructed resonances are controlled by the resonance control signals which are generally representative of the second factor. In the synthesizer of the present invention, however, both the bandwidths and frequencies of the reconstructed resonances are varied with time in accordance with Expressions 14*a*, 14*b*, and 14*c*, in the manner described below.

*Apparatus*

Several embodiments of the principles of this invention are illustrated in block diagram form in FIGS. 1A, 1B, 2, and 3, in which signal paths between various circuit elements are shown by single lines in order to avoid unnecessary complexity. It will be obvious to those skilled in the art at which points one or more wire pairs or other complete circuits may be required to practice this invention.

Figure 1A:
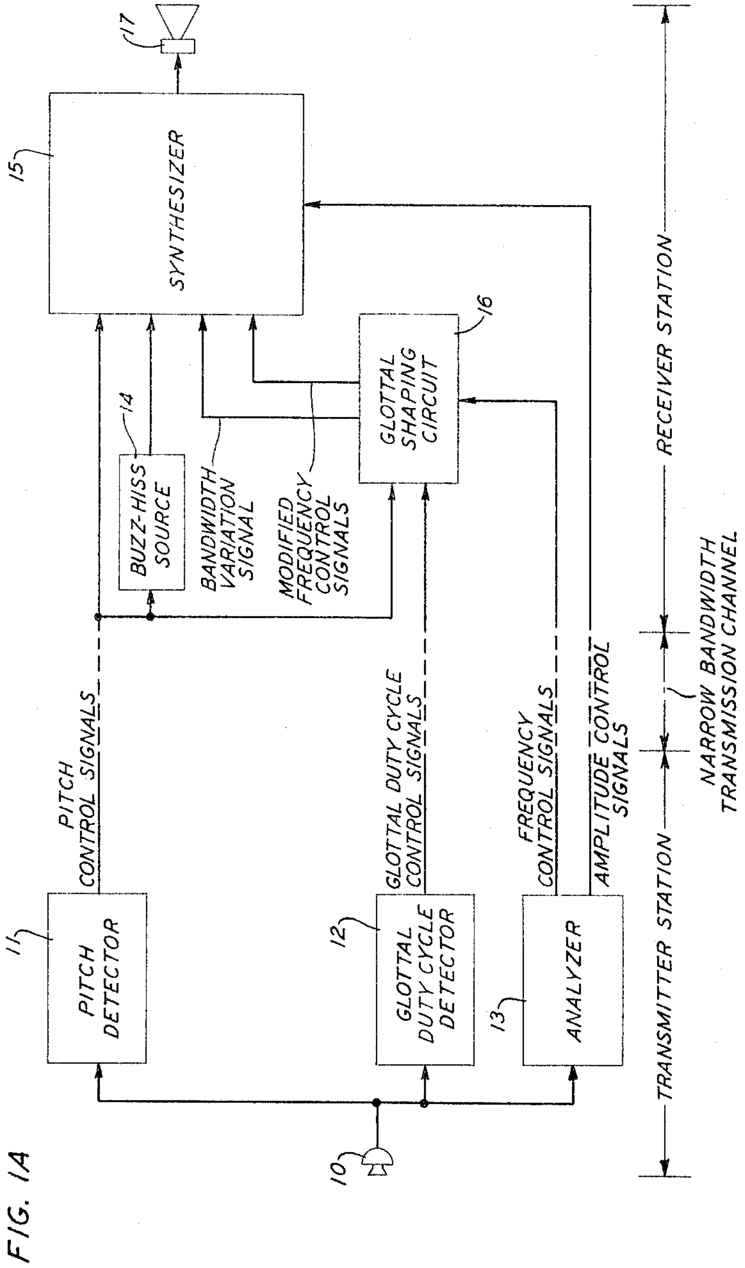
FIG. 1A is a block diagram showing a complete bandwidth compression system embodying the principles of this invention.

Referring first to FIG. 1A, this drawing shows a complete resonance vocoder system embodying the principles of this invention. At the transmitter station, a speech wave from source 10, for example, a conventional microphone, is applied in parallel to elements 11, 12, and 13.

Element 11 is a pitch detector that analyzes the incoming speech wave to derive a pitch control signal indicative of the periodicity or randomness of the speech wave at a given instant. Element 11 may be any well-known pitch detector; for example, element 11 may comprise the detector shown in R. Riesz Patent 2,522,539, issued September 19, 1950.

Figure 5A:
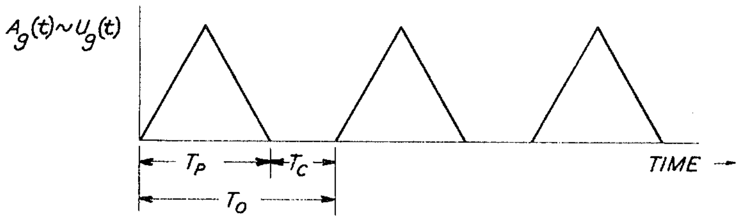
FIGS. 5A, 5B, 5C, 5D and 5E are graphs of assistance in explaining certain features of the present invention.

Element 12, a so-called glottal duty cycle detector, derives from the incoming speech wave a control signal representative of the duration of the nonzero portion of each period of the glottal volume velocity function, $U_g$. An idealized version of the waveform of the glottal volume velocity function for voiced sounds is illustrated in FIG. 5A, where the period $T_o$ comprises a nonzero, triangular portion of duration $T_p$ and a zero amplitude portion of duration $T_c$, so that $T_o=T_p+T_c$. The duration of the nonzero portion of each period of the waveform in FIG. 5A corresponds to the length of time that the glottis is open during each period, while the duration of the zero portion of each period corresponds to the length of time that the glottis is closed during each period. Thus during voiced portions of the incoming speech wave the control signal obtained by detector 12 represents the instantaneous value of $T_p$, while the pitch control signal obtained by detector 11 represents the instantaneous value of $T_o$ or its reciprocal $1/T_o$. If desired, glottal duty cycle detector 12 may be of a construction similar to that of the apparatus shown in the previously cited copending application of M. V. Mathews and J. E. Miller.

Analyzer 13, which may be a resonance vocoder analyzer of the type described in E. S. Weibel Patent 2,817,707, issued December 24, 1957, obtains from the incoming speech wave two groups of resonance or formant control signals, one representative of the amplitudes and the other representative of the frequencies of selected formants or peaks in the speech amplitude spectrum. Since the spectral amplitude peaks correspond very closely to the resonances of the vocal tract, the resonance control signals represent the vocal tract resonances with a relatively high degree of accuracy. The bandwidths of the control signals obtained by analyzer 13, like the bandwidths of the control signals obtained by detectors 11 and 12, are relatively narrow, so that the control signals derived at the transmitter station by elements 11, 12, and 13 may be transmitted to a receiver station over a transmission channel of substantially narrower bandwidth than that required for facsimile transmission of the incoming speech wave.

At the receiver station, the pitch control signal is applied in parallel to synthesizer 15, buzz-hiss source 14, and glottal shaping circuit 16. Synthesizer 15 reconstructs an artificial speech wave from the incoming control signals, and the structure of synthesizer 15 may be based upon that of the synthesizer in the above-mentioned Weibel patent; however, the structure of the resonant circuits of the Weibel synthesizer must be modified in the fashion indicated in FIG. 1B and described below. Buzz-hiss source 14 may be any one of a number of well-known arrangements for generating from the pitch control signal an excitation signal for use in synthesizer 15; for example, buzz-hiss source 14 may be as shown in the above-mentioned Riesz patent. Shaping circuit 16, which is shown in detail FIGS. 1B and 3 and described below, operates to modify the transmitted frequency control signals before they are applied to synthesizer 15 in accordance with Equations (14*b*) and (14*c*), and to generate a bandwidth variation signal in accordance with Relation 14*a*.

The modified frequency control signals and the bandwidth control signal from shaping circuit 16 are applied to synthesizer 15 together with the pitch control signal, the excitation signal from source 14, and the transmitted formant amplitude control signals. Synthesizer 15 employs these applied signals in the fashion shown in the Weibel patent and in FIG. 1B of this application to reconstruct an artificial speech wave with an amplitude spectrum whose formants vary in frequency and bandwidth during each period of voiced speech as specified by Relations 14*a* and 14*b*. The artificial speech wave produced by synthesizer 15 may be converted by reproducer 17 into audible speech having natural sounding resonances, where reproducer 17 may be a conventional loudspeaker.

Figure 1B:
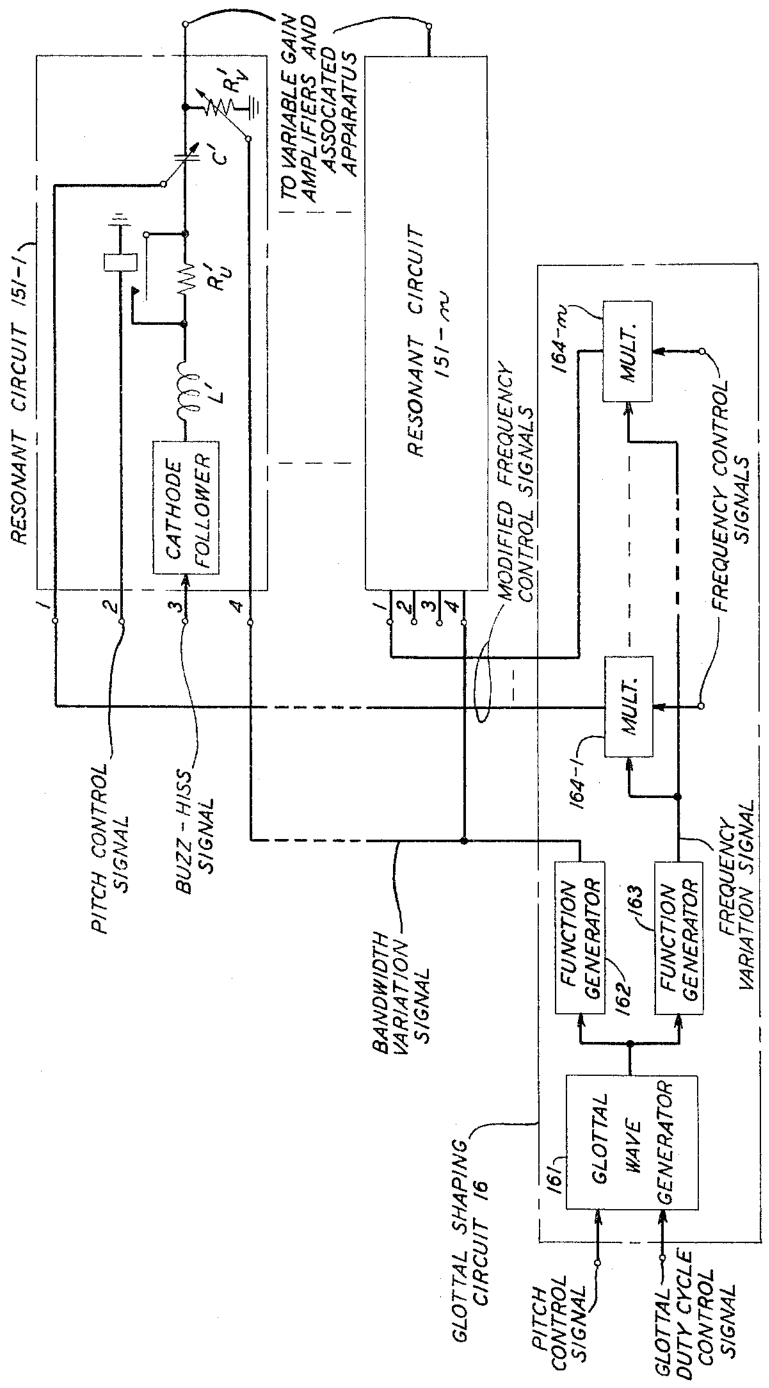
FIG. 1B is a block diagram showing in detail certain components of the system illustrated in FIG. 1A.

The structures of shaping circuit 16 and synthesizer 15, which cooperate to vary the formant frequencies and bandwidths of the artificial speech wave, are illustrated in detail in FIG. 1B. As shown in FIG. 1B, shaping circuit 16 contains a glottal wave generator 161 which generates from the transmitted pitch and glottal duty cycle control signals a wave whose shape closely resembles the waveform of the glottal area function, $A_g(t)$. Specifically, generator 161 is similar in construction to the buzz source shown in the above-mentioned Mathews-Miller application and generates a signal representative of the glottal volume velocity function, $U_g$. As shown in the previously cited article, "Some Properties of the Glottal Sound Source," the glottal area function and the glottal volume velocity function have approximately the same shape, and to a first approximation the waveform produced by generator 161 may be used to represent the glottal area function.

Figure 5B:
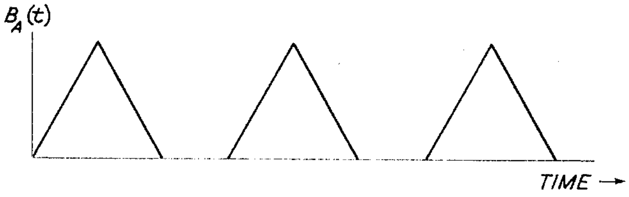
Figure 5C:
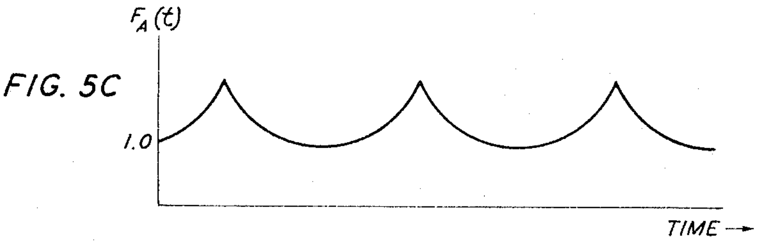
Figure 5D:
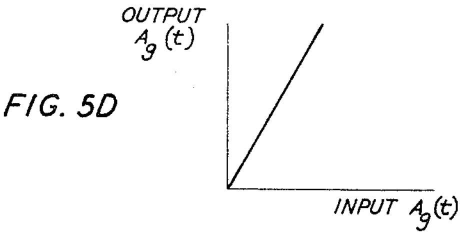
Figure 5E:
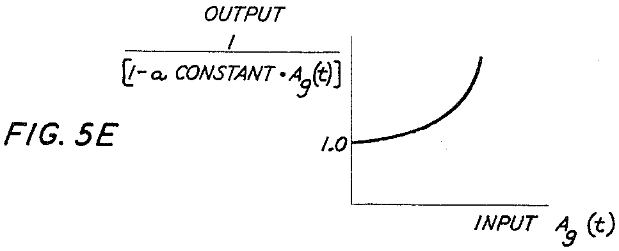

From generator 161 the glottal area signal is applied in parallel to function generators 162 and 163. Function generators 162 and 163 are conventionally constructed circuits for generating at their respective output terminals signals which are functions of the glottal area function signal according to Relations 14*a* and 14*c*, respectively. The waveforms of the output signals of generators 162 and 163 are graphically illustrated in FIGS. 5B and 5C, respectively, in which it is noted that the output signal of generator 162 has the same waveform as the glottal area function, as specified by Relation 14*a*, whereas the waveform of the output signal of generator 163 follows the shape specified by Relation 14*c*. FIGS. 5D and 5E illustrate the input-output characteristics of generators 162 and 163, which may be realized by well-known operational amplifiers of the type described by W. J. Karplus and W. W. Soroka in Analog Methods (2d ed. 1959). However, it is to be understood that function generators 162 and 163 may be constructed with input-output characteristics other than those shown in FIGS. 5D and 5E, if desired, in order to introduce other variations into the bandwidths and frequencies of the resonances of the artificial speech reconstructed by synthesizer 15.

The output signal of function generator 162 therefore represents the variation in formant bandwidths during each period of voiced speech sounds due to changes in the glottal area function, and in the present invention this signal is employed in synthesizer 15 as a bandwidth variation signal to vary the bandwidths of the reconstructed formants of the artificial speech wave. This variation in formant bandwidths is accomplished by applying the bandwidth variation signal in parallel to control terminal 4 of each resonant circuit 151–1 through **151–*n* included in synthesizer 15**. Control terminal 4 in each resonant circuit is connected to a variable damping resistor $R_v'$, where the resistance of $R_v'$ is set at a predetermined value corresponding to a selected resonance bandwidth in the event that the magnitude of the bandwidth variation signal is zero, that is, in the event that $B_A$ in Equation 14*a* is zero, $R_v'$ is proportional to $B_c$. However, when the additive component $B_A$ is nonzero, the bandwidth variation signal causes the resistance of $R_v'$ to vary additively in accordance with Equation 14*a*. The other elements of each of the resonant circuits 151–1 through **151–*n*** may be identical with the corresponding elements of the resonant circuit shown in FIG. 6 of the Weibel patent.

Further, the output signal of function generator 163 represents the variation in formant frequencies during each period of voiced speech sounds, and in the present invention this signal is used to modify the transmitted frequency control signals in accordance with Equation 14*b*, that is, each of the incoming frequency control signals is multiplied by the output signal of function generator 163 in multipliers 164–1 through **164–*n*. Multipliers 164–1 through 164–*n***, which may be of conventional construction, have two input terminals and one output terminal, and the number *n* of multipliers is in one-to-one correspondence with the number of incoming frequency control signals. The output signal of function generator 163 is applied in parallel to one of the input terminals of each of the multipliers, and each of the frequency control signals is applied to the other input terminal of the corresponding multiplier so that the product signals developed at the output terminals of the multipliers are modified frequency control signals which represent both the frequencies of selected speech resonances and their variations in frequency due to changes in glottal area, as specified by Relation 14*b*.

From shaping circuit 16 the modified frequency control signals developed by multipliers 164–1 through **164–*n* are applied to the appropriate input points of resonant circuits 151–1 through 151–*n*, respectively. As shown in FIG. 1B, the output signal of each multiplier is applied to input point 1 of the corresponding resonant circuit. Within each resonant circuit, input point 1 is connected to the control terminal of an electronically variable capacitance, for example, as shown in resonant circuit 151–1, the variable capacitance may be a conventional reactance tube, denoted C′. By varying the capacitance of C′ in response to the modified frequency control signal from circuit 16, the resonant frequency of each resonant circuit is varied, thereby reproducing in the output signal of each resonant circuit not only the frequency of the corresponding speech resonance but also the variations in resonance frequency due to changes in glottal area. Following each resonant circuit 151–1 through 151–*n*** is a variable gain amplifier and other associated apparatus, as shown and described in detail in the Weibel patent.

Figure 2:
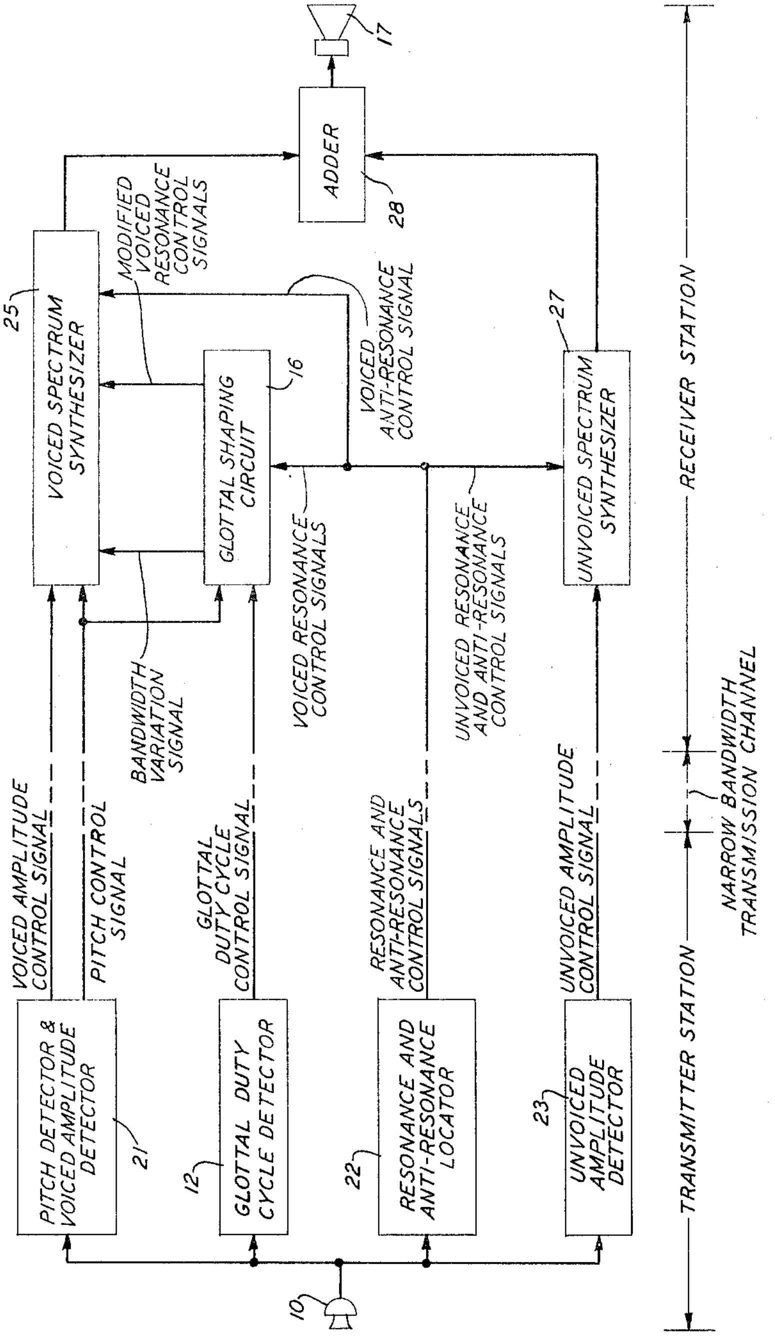
FIG. 2 is a block schematic diagram showing another complete resonance vocoder system embodying the principles of this invention.

Another complete resonance vocoder system embodying the principles of this invention is shown in FIG. 2. At the transmitter station of this system, the incoming speech wave from source 10 is applied in parallel to elements 21, 22, and 23, in addition to glottal duty cycle detector 12 which may be identical with element 12 in FIG. 1A. Detector 21 obtains from the speech wave a pitch control signal and a voiced amplitude control signal respectively representative of the periodicity or randomness of the speech wave and the energy of voiced portions of the speech wave; locator 22 derives a group of resonance and antiresonance control signals representative of the frequencies of selected resonances and antiresonances of voiced and unvoiced portions of the speech wave; and unvoiced amplitude detector 23 obtains an unvoiced amplitude control signal representative of the energy of unvoiced portions of the speech wave. The design of elements 21, 22, and 23 may be the same as that of the corresponding elements described in the copending application of E. E. David, Jr. and J. L. Flanagan, Serial No. 235,703, filed November 6, 1962, now Patent 3,190,963, granted June 22, 1965.

The control signals obtained at the transmitter station are transmitted over a narrow bandwidth transmission system to a receiver station, where they are employed to reconstruct a natural sounding replica of the original speech wave. At the receiver station, the pitch and voiced amplitude control signals are applied to voiced spectrum synthesizer 25, while the glottal duty cycle control signal and the pitch control signal are applied to shaping circuit 16. Further, the voiced resonance control signals are delivered to shaping circuit 16, the voiced antiresonance control signal is delivered to synthesizer 25, and the unvoiced resonance and antiresonance control signals, together with the unvoiced amplitude control signal, are delivered to unvoiced spectrum synthesizer 27. The structure of synthesizers 25 and 27 may be similar to that of the corresponding synthesizers in the above-mentioned copending David, Jr.-Flanagan application, while shaping circuit 16 is identical with shaping circuit 16 in FIGS. 1A and 1B.

Shaping circuit 16 modifies the voiced resonance control signals in accordance with Equation 14*b* before they are applied to synthesizer 25, and also generates a bandwidth variation signal in accordance with Expression 14*a*. The modified resonance control signals and the bandwidth variation signal are then supplied to synthesizer 25, where they control the reconstruction of a replica of voiced portions of the original speech amplitude spectrum so that the frequencies and bandwidths of the formants of the reconstructed spectrum vary during each period with changes in the glottal area. From synthesizer 25 the reconstructed voiced spectra are combined in adder 28 with the reconstructed unvoiced spectra produced by synthesizer 27 to form an artificial speech wave. A natural sounding replica of the original speech may then be obtained by converting the artificial speech wave from adder 28 into audible sounds by a reproducer 17.

Figure 3:
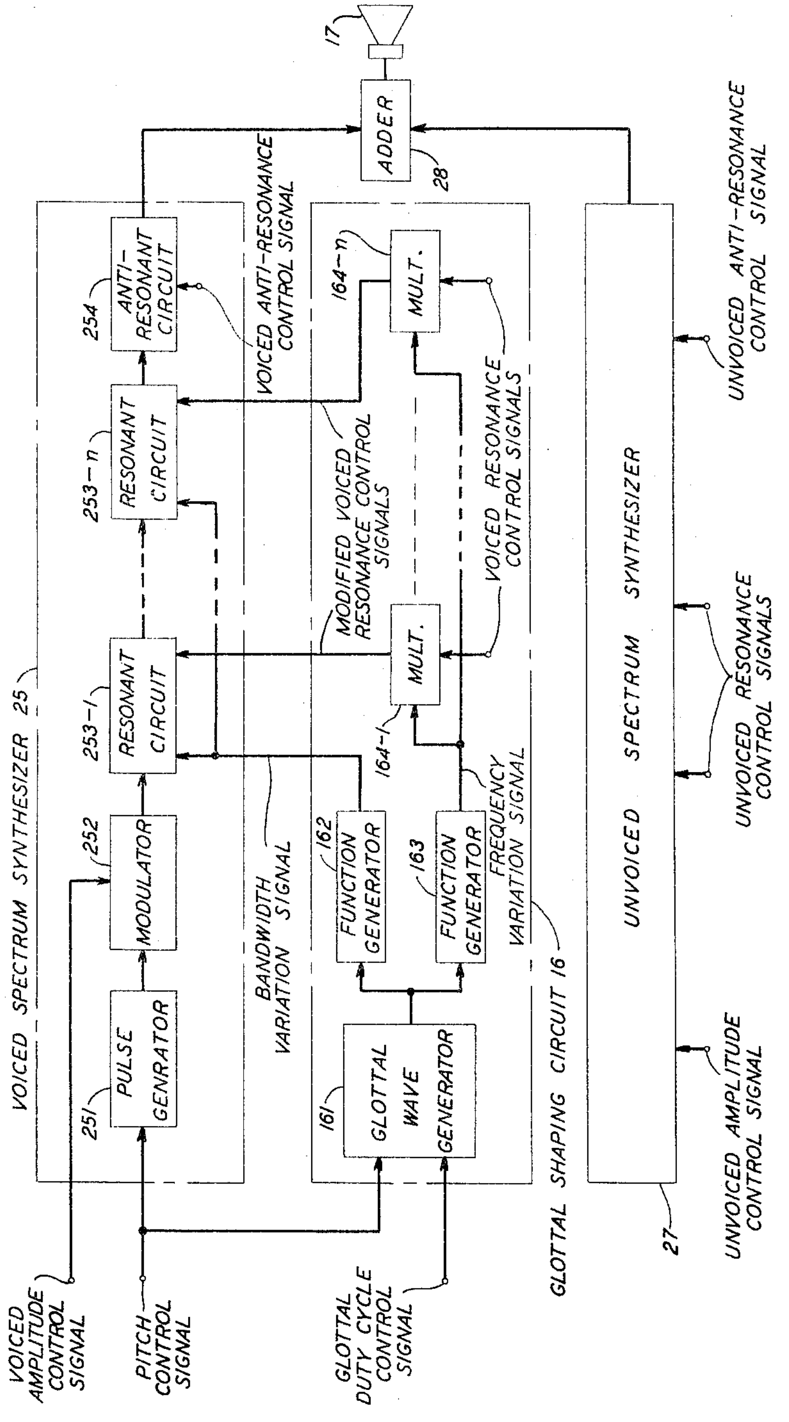
FIG. 3 is a block diagram showing in detail certain components of the system illustrated in FIG. 2.

FIG. 3 illustrates in detail the cooperation between the structures of shaping circuit 16 and synthesizer 25 in introducing variations due to glottal area changes into the reconstructed resonance frequencies and bandwidths. As in FIG. 1B, shaping circuit 16 generates a bandwidth variation signal and a frequency variation signal from the incoming pitch and glottal duty cycle control signals by means of glottal wave generator 161 and function generators 162 and 163. The bandwidth variation signal from generator 162 is applied to the bandwidth control terminals of resonant circuits 253–1 through **253–*n*, which may be identical with the corresponding circuits shown in FIGS. 3A and 5 of the copending David, Jr.-Flanagan application. The frequency variation signal from generator 163 is applied in parallel to one of the input terminals of each multiplier 164–1 through 164–*n*, which are in one-to-one correspondence with the incoming voiced resonance control signals, while each of the incoming voiced resonance control signals is applied to the other input terminal of the corresponding multiplier. This arrangement produces at the output terminals of multipliers 164–1 through 164–*n* a group of modified voiced resonance control signals which represent both the frequencies of selected voiced resonances and the variations in resonance frequencies with changes in glottal area. From shaping circuit 16** each of the voiced resonance control signals is applied to the resonance control terminal of the appropriate resonant circuit, which, as shown in FIG. 3A of the copending David, Jr.-Flanagan application, is connected in turn to the control terminal of a variable capacitance.

Although this invention has been described in terms of speech communications systems of the type shown in FIGS. 1A and 3, it is to be understood that applications of the principles of this invention are not limited to the field of speech communications, but include the fields of automatic speech recognition, speech processing, and automatic message recording and reproduction. In addition, it is to be understood that the above-described embodiments are merely illustrative of the numerous arrangements which may be devised for the principles of this invention by those skilled in the art without departing from the spirit and scope of the invention.

What is claimed is:

1. Apparatus for reconstructing artificial speech which comprises a source of a first control signal representative of the periodicity of voiced portions of a speech wave, a source of a second control signal representative of the glottal duty cycle of said speech wave, means supplied with said first control signal and said second control signal for generating a glottal area wave closely representative of the time-varying area of the glottis during each period of said speech wave, a plurality of frequency control signals representative of the frequencies of selected resonances of said speech wave, first function generating means for obtaining from said glottal area wave a bandwidth variation signal indicative of a selected relationship between the bandwidths of said speech resonances and the area of said glottis, second function generating means for obtaining from said glottal area wave a frequency variation signal indicative of a selected relationship between the frequencies of said speech resonances and the area of said glottis, a plurality of multiplying means in one-to-one correspondence with said frequency control signals, each of said multiplying means being provided with first and second input terminals and an output terminal, means for simultaneously applying said frequency variation signal to the first input terminal of each of said multiplying means, means for applying each of said frequency control signals to the second input terminal of the corresponding multiplying means so that the product signals developed at the output terminals of said multiplying means indicate both the frequencies of selected resonances of said speech wave and variations in said resonance frequencies arising from said selected relationship between said frequencies and the area of said glottis, and means supplied with said bandwidth variation signal and said product signals for synthesizing a plurality of artificial resonances to form a replica of said speech wave, said artificial resonances closely following in bandwidth and frequency said selected resonances of said speech wave.

2. Apparatus as defined in claim 1 wherein said first function generating means obtains from said glottal area wave a bandwidth variation signal indicative of a linear relationship between the bandwidth of said speech resonances and the area of said glottis.

3. Apparatus as defined in claim 1 wherein said second function generating means obtains from said glottal area wave a frequency variation signal indicative of the relationship $$\frac{1}{[1-\text{a constant}\cdot A_g(t)]}$$

between the frequencies of said speech resonances and the area of said glottis, where $A_g(t)$ denotes the time-varying area of said glottis.

4. Apparatus for synthesizing a natural sounding replica of a speech wave which comprises a source of a bandwidth variation signal representative of selected variations in the bandwidths of the resonances of a speech wave due to changes in the glottal area, a source of a plurality of frequency control signals representative of both the frequencies of selected resonances of said speech wave and variations in said frequencies due to changes in the glottal area, and means responsive to said bandwidth variation signal and said frequency control signals for reconstructing a replica of the resonances of said speech wave.

5. A speech communication system that comprises a transmitter station including a source of an incoming speech wave, means for deriving from said incoming speech wave a first control signal representative of the instantaneous periodicity or randomness of voiced or unvoiced portions, respectively, of said speech wave, means for obtaining from said speech wave a second control signal representative of the glottal duty cycle of said speech wave, and an analyzer for deriving from said speech wave a plurality of frequency and amplitude control signals representative of the frequencies and amplitudes of selected resonances of said speech wave, a transmission medium connecting said transmitter station to a receiver station for delivering said first control signal, said second control signal, and said plurality of frequency and amplitude control signals to said receiver station, and at said receiver station, means for obtaining from said first control signal an excitation signal for the synthesis of artificial speech, means for obtaining from said first and second control signals a bandwidth variation signal and a frequency variation signal respectively representative of variations in the bandwidths and frequencies of resonances of said speech wave due to changes in the glottal area during each period of voiced portions of said speech wave, means supplied with said frequency variation signal and said plurality of frequency control signals for multiplying each frequency control signal by said frequency variation signal to develop a corresponding plurality of product signals, and means responsive to said first control signal, said bandwidth variation signal, said plurality of product signals, and said plurality of amplitude control signals for generating from said excitation signal a plurality of artifical resonances to form a replica of said speech wave.

6. A speech bandwidth compression system that comprises a transmitter station including a source of an incoming speech wave, analyzing means supplied with said speech wave for deriving a plurality of narrow bandwidth control signals representative of selected information bearing characteristics of said speech wave including means for deriving a pitch control signal representative of the periodicity of voiced portions of said speech wave, means for deriving a glottal duty cycle control signal representative of the duration of nonzero portions of the glottal volume velocity function of voiced portions of said speech wave, and means for deriving a plurality of frequency and amplitude control signals respectively representative of the frequencies of selected voiced and unvoiced resonances and antiresonances and the amplitudes of voiced and unvoiced portions of said speech wave, a transmission medium for delivering said plurality of narrow bandwidth control signals to a receiver station, and at said receiver station, means for generating from said pitch control signal and said glottal duty cycle control signal a bandwidth variation signal and a frequency variation signal respectively representative of variations in the bandwidths and frequencies of the resonances of said speech wave due to changes in the glottal area during each period of voiced portions of said speech wave, means for multiplying together said frequency variation signal and each of said voiced resonance control signals to develop a plurality of product signals, means responsive to said voiced antiresonance control signal, said voiced amplitude control signal, said pitch control signal, said plurality of product signals, and said bandwidth variation signal for synthesizing replicas of the voiced portions of said speech wave, means responsive to said unvoiced resonance and antiresonance control signals and said unvoiced amplitude control signal for synthesizing replicas of the unvoiced portions of said speech wave, and means for combining said voiced and unvoiced replicas to form an artificial speech wave.

7. A glottal shaping circuit comprising a glottal wave generator provided with two input terminals and an output terminal for generating a signal approximating the glottal area function of a speech wave, a source of a pitch control signal representative of the periodicity of voiced portions of a human speech wave, a source of a glottal duty cycle control signal representative of the duration of the nonzero portion of each period of the glottal volume velocity function of said speech wave, means for applying said pitch control signal to one of the input terminals of said glottal wave generator, means for applying said glottal duty cycle control signal to the other input terminal of said glottal wave generator, a first function generator having a selected linear input-output characteristic and provided with an input terminal and an output terminal for developing at its output terminal an output signal, denoted $B_A$, which is a selected linear function of a signal applied to its input terminal, a second function generator having an input-output characteristic of the form $$\frac{1}{[1-(\text{a constant}\cdot\text{input signal})]}$$

and provided with an input terminal and an output terminal, so that the output signal, denoted $F_A$, developed at the output terminal of said second function generator is related to an input signal, denoted $A_g(t)$, applied to its input terminal by the equation $$F_A=\frac{1}{[1-\text{a constant}\cdot A_g(t)]}$$

means for connecting the output terminal of said glottal wave generator to the input terminals of said first and second function generators, a source of a plurality of signals representative of the frequencies of selected resonances of said speech wave, a plurality of multipliers in one-to-one correspondence with said resonance signals, each of said multipliers being provided with two input terminals and an output terminal, means for connecting the output terminal of said second function generator to one of the input terminals of each of said multipliers, and means for applying each of said resonance signals to the other input terminal of its corresponding multiplier.

8. A system for reconstructing artificial speech which comprises a source of a plurality of narrow bandwidth control signals representative of the frequencies of selected resonances of a speech wave, means supplied with said control signals for modifying said control signals to represent both the frequencies of said selected resonances and variations in said frequencies due to changes in the glottal area function of said speech wave, and means responsive to said modified control signals for synthesizing replicas of said selected resonances.

9. A system for reconstructing artificial speech which comprises a source of a plurality of narrow bandwidth control signals representative of the frequencies of selected resonances of a speech wave, means supplied with said control signals for modifying said control signals to represent both the frequencies of said selected resonances and variations in said frequencies due to changes in the glottal area function of said speech wave, a source of a bandwidth variation signal indicative of variations in the bandwidths of said resonances due to changes in the glottal area function of said speech wave, and means responsive to said modified control signals and said bandwidth variation signal for synthesizing replicas of said selected resonances.

10. The method of transmitting speech which comprises compressing the frequency and bandwidth of selected resonances of a speech wave, transmitting said resonances as compressed to a receiver station, and at said receiver station, varying said resonances as compressed to follow changes in the glottal area function of said speech wave, expanding the frequency and bandwidth of said resonances as varied, and reproducing said expanded resonances.

11. A system for reconstructing artificial speech which comprises a source of a plurality of narrow bandwidth control signals representative of the frequencies of selected resonances of a speech wave, a source of a bandwidth variation signal indicative of variations in the bandwidths of said resonances due to changes in the glottal area function of said speech wave, and means responsive to said control signals and said bandwidth variation signal for synthesizing replicas of said selected resonances.

No references cited.

KATHLEEN H. CLAFFY, *Primary Examiner.*

R. MURRAY, *Assistant Examiner.*